US008199730B2

(12) United States Patent
Ou et al.

(10) Patent No.: US 8,199,730 B2
(45) Date of Patent: Jun. 12, 2012

(54) METHOD AND APPARATUS FOR HANDLING UPLINK GRANT

(75) Inventors: Meng-Hui Ou, Taipei (TW); Yu-Hsuan Guo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 441 days.

(21) Appl. No.: 12/536,501

(22) Filed: Aug. 6, 2009

(65) Prior Publication Data

US 2010/0034162 A1 Feb. 11, 2010

Related U.S. Application Data

(60) Provisional application No. 61/086,809, filed on Aug. 7, 2008.

(51) Int. Cl.
*H04J 3/00* (2006.01)
(52) U.S. Cl. ......... 370/336; 370/349; 370/462; 714/748
(58) Field of Classification Search ..................... None
See application file for complete search history.

(56) References Cited

U.S. PATENT DOCUMENTS

| 7,447,504 | B2 * | 11/2008 | Lohr et al. | 455/450 |
|---|---|---|---|---|
| 7,860,052 | B2 * | 12/2010 | Lohr et al. | 370/329 |
| 7,961,680 | B2 * | 6/2011 | Park et al. | 370/329 |
| 7,979,769 | B2 * | 7/2011 | Chun et al. | 714/748 |
| 2009/0097444 | A1 * | 4/2009 | Lohr et al. | 370/329 |
| 2011/0124360 | A1 * | 5/2011 | Sagfors et al. | 455/509 |

FOREIGN PATENT DOCUMENTS

WO 2008041824 4/2008

OTHER PUBLICATIONS

Ericsson: "E-Utran Random Access procedure C-RNTI assignment and HARQ on message 4" 3GPP DRAFT TSG-RAN WG2#56bis, Tdoc R2-070363, Jan. 15-19, 2007, pp. 1-3, XP050133441, Sorrento, Italy.
Ericsson: "Clarification of DL- and UL-SCH Data Transfer" 3GPP DRAFT TSG-RAN2 Meeting #62bis, R2-083727, Jun. 30-Jul. 4, 2008, [Paragraph 3.1], [Paragraph 5.4.1] and [Paragraph 5.4.2], XP050141047, Warsaw, Poland.
Ericsson: "Handling of Semi-Persistent Assignments and Grants" 3GPP DRAFT TSG-RAN2 Meeting #62bis, R2-083402, Jun. 30-Jul. 4, 2008, [Paragraph 5.4.1], XP050140795, Warsaw, Poland.
3GPP TS 36.321 V8.2.0, May 2008.
3GPP, R2-083726, RAN2 #62bis UP minutes, Jun. 2008.
3GPP, R2-083252, "Preamble group selection in the RACH procedure", Jun. 2008.

(Continued)

*Primary Examiner* — Kwang B Yao
*Assistant Examiner* — Alex Skripnikov
(74) *Attorney, Agent, or Firm* — Klein, O'Neill & Singh, LLP

(57) ABSTRACT

A method for handling an uplink grant received on a physical downlink control channel (PDCCH) in a user equipment (UE) of a wireless communication system is disclosed. The method includes steps of setting a Temporary Cell Radio Network Temporary Identifier (Temporary C-RNTI) of the UE to a value assigned in a Random Access Response message, monitoring a contention resolution message, receiving an uplink grant on PDCCH addressed to the Temporary C-RNTI, and not using the uplink grant to transmit data if the uplink grant corresponds to a Hybrid Automatic Repeat Request (HARQ) Process different from an HARQ Process used for transmission of a MediumAccess Control (MAC) Protocol Data Unit (PDU) in a Message 3 buffer.

12 Claims, 7 Drawing Sheets

OTHER PUBLICATIONS

Nokia Corporation et al.: "Allocation of RNTI values," 3GPP TSG-RAN WG2 Meeting #61, R2-080987, Feb. 11-15, 2008, XP050138781.
3GPP TSG-RAN2 Meeting #65, Athens, Greece. Feb. 9-13, 2009.
3GPP TSG-RAN2 Meeting 66. San Francisco, U.S.A., May 4-8, 2009.
3GPP TSG-RAN2 Meeting #63, Jeju Island, Korea, Aug. 18-22, 2008.
3GPP TSG-RAN WG2 #65, Athens, Greece, Feb. 9-13, 2009.
3GPP TSG-RAN2 Meeting #65, Athens, Greece, Feb. 9-13, 2009.
e-IPR Claim Table—2009—W21.
Office Action on corresponding foreign application (JP2009-183635) from JPO dated Sep. 20, 2011.

* cited by examiner

METHOD AND APPARATUS FOR HANDLING UPLINK GRANT

CROSS REFERENCE TO RELATED APPLICATIONS

This application claims the benefit of U.S. Provisional Application No. 61/086,809, filed on Aug. 7, 2008 and entitled "Method and apparatus for improving resource allocation of random access procedure in a wireless communication system", the contents of which are incorporated herein by reference.

BACKGROUND OF THE INVENTION

1. Field of the Invention

The present invention relates to a method and apparatus for handling an uplink grant, and more particularly, to a method and apparatus for handling an uplink grant received on a physical downlink control channel (PDCCH) in a user equipment (UE) of a wireless communication system, so as to avoid misusing the uplink grant for transmission.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE system, when a user equipment (UE) wants to access radio network resources, it needs to connect to nearby base stations for timing and frequency synchronization, and starts to receive system information broadcasted by the network. The UE sends an access request on a Random Access Channel (RACH) based on the received system information and parameters. There are five reasons for triggering a random access procedure: (1) Initial access request; (2) Reestablishment request; (3) Handover request; (4) Uplink data arrival; and (5) Downlink data arrival. In general, it is possible that multiple access requests from different UEs arrive at the base station at the same time. The random access procedure can be divided into two types: Contention-based, e.g. the way the UE uses to perform initial access, and Non Contention-based, e.g. the random access procedure initiated by handover with a dedicate preamble provided by a base station.

According to 3GPP specification TS 36.321 v8.2.0, the contention-based random access procedure consists of exchange of four messages: Message 1, Message 2, Message 3 and Message 4. From a standpoint of the UE, Message 1 and Message 3 are for uplink while Message 2 and Message 4 are for downlink. At first, Message 1 transmits a Random Access Preamble, randomly selected by the UE from a selected group of Random Access Preambles, to the network for requesting an uplink grant. Several UEs may use the same Random Access Preamble at the same time. Message 2, also called a Random Access Response message, carrying an uplink grant and a Temporary Cell Radio Network Temporary Identifier (Temporary C-RNTI) is then transmitted from the network to the UEs those sent the Random Access Preamble. Thus, the UEs using the same Random Access Preamble in Message 1 would receive the same uplink grant and Temporary C-RNTI from Message 2 and use the same uplink grant to transmit Message 3, so as to cause contention between the UEs. The content carried by Message 3 mainly includes uplink data and a User Equipment Identity (UE ID). Message 4, also called a Contention Resolution message, is then used for the network to resolve the contention between the UEs.

The way in which Message 4 is dealt with by the UE is based on the UE ID type carried in Message 3. The UE ID carried in Message 3 can be divided into two types: Cell Radio Network Temporary Identifier (C-RNTI) MAC control element and Common Control Channel Service Data Unit (CCCH SDU). The C-RNTI MAC control element is a MAC control element generated by MAC layer, while the CCCH SDU is generated by Radio Resource Control (RRC) layer, for performing RRC Connection Request or RRC Connection Reestablishment Request. When Message 3 including a C-RNTI MAC control element is transmitted, the UE shall start a Contention Resolution Timer and monitor whether there is a Message 4, an uplink grant received on a Physical Downlink Control Channel (PDCCH) addressed to the C-RNTI of the UE. But if the random access procedure is triggered by downlink data arrival, the PDCCH transmission addressed to the C-RNTI does not necessarily contain an uplink grant. If the UE receives a Message 4, the UE considers its Contention Resolution successful and considers itself as a contention winner; otherwise, if the UE cannot receive a Message 4 until expiry of the Contention Resolution Timer, the UE considers its Contention Resolution not successful and considers itself as a contention loser.

On the other hand, when Message 3 including a CCCH SDU is transmitted, the UE also starts the Contention Resolution Timer but uses the Temporary C-RNTI received from Message 2 to monitor PDCCH for reception of Message 4. However, the UEs using the same Random Access preamble receive the same Message 2, and obtain the same uplink grant and Temporary C-RNTI. Therefore, when the network sends a Message 4 addressed to the Temporary C-RNTI, the UEs obtaining the same Temporary C-RNTI would all receive this Message 4. In this case, the UE further compares a UE Contention Resolution Identity MAC control element decoded from the received Message 4 with the CCCH SDU carried in Message 3. If the UE Contention Resolution Identity MAC control element matches the CCCH SDU transmitted in Message 3, the UE considers its Contention Resolution successful and considers itself as a contention winner; otherwise, the UE considers its Contention Resolution not successful and considers itself as a contention loser. In addition, if the UE cannot receive a PDCCH transmission addressed to the Temporary C-RNTI until expiry of the Contention Resolution Timer, the UE also considers its Contention Resolution not successful and considers itself as a contention loser.

Please refer to FIG. 1, which illustrates a contention resolution operation of the prior art. Assume that the UE A sends a Message 3 including CCCH SDU to the network at a timing point S. Meanwhile, the UE A starts a Contention Resolution Timer, and monitors PDCCH addressed to a Temporary C-RNTI received from Message 2. Afterwards, the UE receives a Message 4 at a time point T and determines itself as a contention winner after decoding this Message 4. At this time, the UE A stops the Contention Resolution Timer, and uses the Temporary C-RNTI as its C-RNTI. Finally, the UE A sends an HARQ acknowledgement message ACK to the network, and the network allocates an uplink grant to the C-RNTI of the UE A (at a timing point U) for allowing the UE A performing uplink transmission at a timing point V.

Please continue to refer to FIG. 1. Assume that contention occurs between the UE A and the UE B, and the UE B sends a Message 3 including C-RNTI MAC control element to the network at a timing point S. Meanwhile, the UE B starts its Contention Resolution Timer, and monitors PDCCH addressed to its C-RNTI and monitors PDCCH addressed to the Temporary C-RNTI received from Message 2. The purpose to monitor PDCCH addressed to the Temporary C-RNTI is to receive an uplink grant for Message 3 adaptive retransmission. When transmission of the Message 3 fails, the network uses the Temporary C-RNTI to allocate uplink grants to the UE B for retransmission of the Message 3. In FIG. 1, the UE A has already been a contention winner at the timing point T. However, the UE B may not know that it has already become a contention loser until expiry of its Contention Resolution Timer. Thus, the UE B may still use the same Temporary C-RNTI as the UE A to monitor PDCCH, such that the UE B may receive the uplink grant allocated to the UE A at the timing point U and misuse the uplink grant for uplink transmission at the timing point V. As a result, uplink transmission of the contention winner (i.e. the UE A) cannot be successfully performed, causing waste of radio resources.

Besides, when the UE ID carried by Message 3 is CCCH SDU, misuse of the uplink grant may also occur. Please continue to refer to FIG. 1. Assume that contention occurs between the UE A and the UE C, and the UE C transmits a Message 3 including CCCH SDU to the network at a time point S. At the same time, the UE C starts its Contention Resolution Timer, and monitors PDCCH addressed to the Temporary C-RNTI received from Message 2. Generally, when the UE C receives a Message 4 at a timing point T and finds the UE ID decoded from the Message 4 does not match CCCH SDU transmitted in Message 3, the UE C determines itself as a contention loser. However, if the Message 4 cannot be successfully received or decoded before expiry of the UE C's Contention Resolution Timer, the UE C may not know itself as a contention loser and still use the same Temporary C-RNTI as the UE A to monitor PDCCH. In this situation, the UE C would receive the uplink grant allocated to the UE A at the time point U, and misuse the uplink grant for uplink transmission at the timing point V, resulting in that uplink transmission of the contention winner (i.e. the UE A) cannot be successfully performed.

As mentioned above, for the cases of Message 3 including CCCH SDU, if the UE determines itself as a contention winner after the Message 4 is successfully decoded, the UE would use the Temporary C-RNTI received from the Message 2 as its C-RNTI. However, the other UEs may not know itself has become a contention loser due to some reasons and still use the Temporary C-RNTI identical to the C-RNTI of the contention winner to monitor PDCCH, causing the uplink grant allocated to the contention winner is misused by the contention loser. As a result, the UL transmissions by the winner and losers are collided, which is the problem to be solved in the present invention.

SUMMARY OF THE INVENTION

It is therefore an objective of the present invention to provide a method and apparatus for handling an uplink grant received on a physical downlink control channel (PDCCH) in a user equipment (UE) of a wireless communication system.

According to the present invention, a method for handling an uplink grant received on a physical downlink control channel (PDCCH) in a user equipment (UE) of a wireless communication system is disclosed. The method includes steps of setting a Temporary Cell Radio Network Temporary Identifier (Temporary C-RNTI) of the UE to a value assigned in a Random Access Response message; monitoring a Contention Resolution message; receiving an uplink grant on PDCCH addressed to the Temporary C-RNTI; and not using the uplink grant to transmit data when the uplink grant corresponds to a Hybrid Automatic Repeat Request (HARQ) Process different from an HARQ Process used for transmission of a Medium Access Control (MAC) Protocol Data Unit (PDU) in a Message 3 buffer.

According to the present invention, a communications device for handling an uplink grant received on a physical downlink control channel (PDCCH) in a user equipment (UE) of a wireless communication system is disclosed. The communications device includes a processor for executing a program, and a memory, coupled to the processor, for storing the program. The program includes steps of setting a Temporary Cell Radio Network Temporary Identifier (Temporary C-RNTI) of the UE to a value assigned in a Random Access Response message; monitoring a Contention Resolution message; receiving an uplink grant on PDCCH addressed to the Temporary C-RNTI; and not using the uplink grant to transmit data when the uplink grant corresponds to a Hybrid Automatic Repeat Request (HARQ) Process different from an HARQ Process used for transmission of a MediumAccess Control (MAC) Protocol Data Unit (PDU) in a Message 3 buffer.

According to the present invention, a method for handling an uplink grant received on a physical downlink control channel (PDCCH) in a user equipment (UE) of a wireless communication system is disclosed. The method includes steps of setting a Temporary Cell Radio Network Temporary Identifier (Temporary C-RNTI) of the UE to a value assigned in a Random Access Response message; monitoring a Contention Resolution message; receiving a second uplink grant on PDCCH addressed to the Temporary C-RNTI; and not using the second uplink grant to transmit data when a Transport Block (TB) size indicated by the second uplink grant is different from that indicated by a first uplink grant provided in the Random Access Response message for the UE.

According to the present invention, a communications device for handling an uplink grant received on a physical downlink control channel (PDCCH) in a user equipment (UE) of a wireless communication system is disclosed. The communications device includes a processor for executing a program, and a memory, coupled to the processor, for storing the program. The program includes steps of setting a Temporary Cell Radio Network Temporary Identifier (Temporary C-RNTI) of the UE to a value assigned in a Random Access Response message; monitoring a Contention Resolution message; receiving a second uplink grant on PDCCH addressed to the Temporary C-RNTI; and not using the second uplink grant to transmit data when a Transport Block (TB) size indicated by the second uplink grant is different from that indicated by a first uplink grant provided in the Random Access Response message for the UE.

According to the present invention, a method for setting a Cell Radio Network Temporary Identifier (C-RNTI) of a user equipment (UE) of a wireless communication system is disclosed. The method includes steps of setting a Temporary Cell Radio Network Temporary Identifier (Temporary C-RNTI) of the UE to a value assigned in a Random Access Response message; transmitting a Common Control Channel (CCCH) Service Data Unit (SDU) in a Message 3; receiving a contention resolution message, the contention resolution message comprising a UE Contention Resolution Identity MAC control element matching the CCCH SDU transmitted in the Message 3; and setting a C-RNTI of the UE to a specific value different from the Temporary C-RNTI of the UE.

According to the present invention, a communications device for setting a Cell Radio Network Temporary Identifier (C-RNTI) of a user equipment (UE) of a wireless communication system is disclosed. The communications device includes a processor for executing a program, and a memory, coupled to the processor, for storing the program. The program includes steps of setting a Temporary Cell Radio Network Temporary Identifier (Temporary C-RNTI) of the UE to a value assigned in a Random Access Response message; transmitting a Common Control Channel (CCCH) Service Data Unit (SDU) in a Message 3; receiving a contention resolution message, the contention resolution message comprising a UE Contention Resolution Identity MAC control element matching the CCCH SDU transmitted in the Message 3; and setting a C-RNTI of the UE to a specific value different from the Temporary C-RNTI of the UE.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
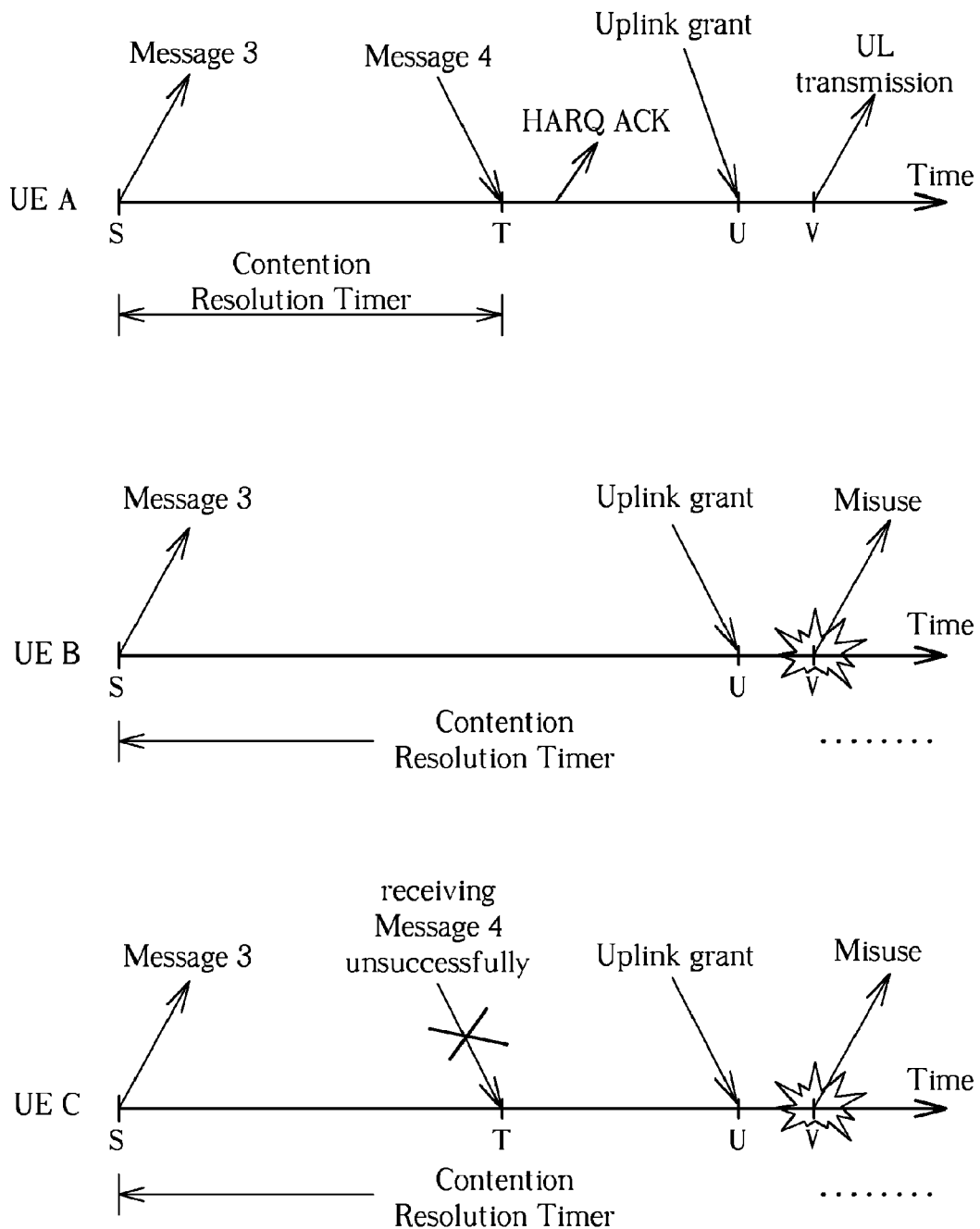
FIG. 1 illustrates a contention resolution operation of the prior art.
Figure 2:
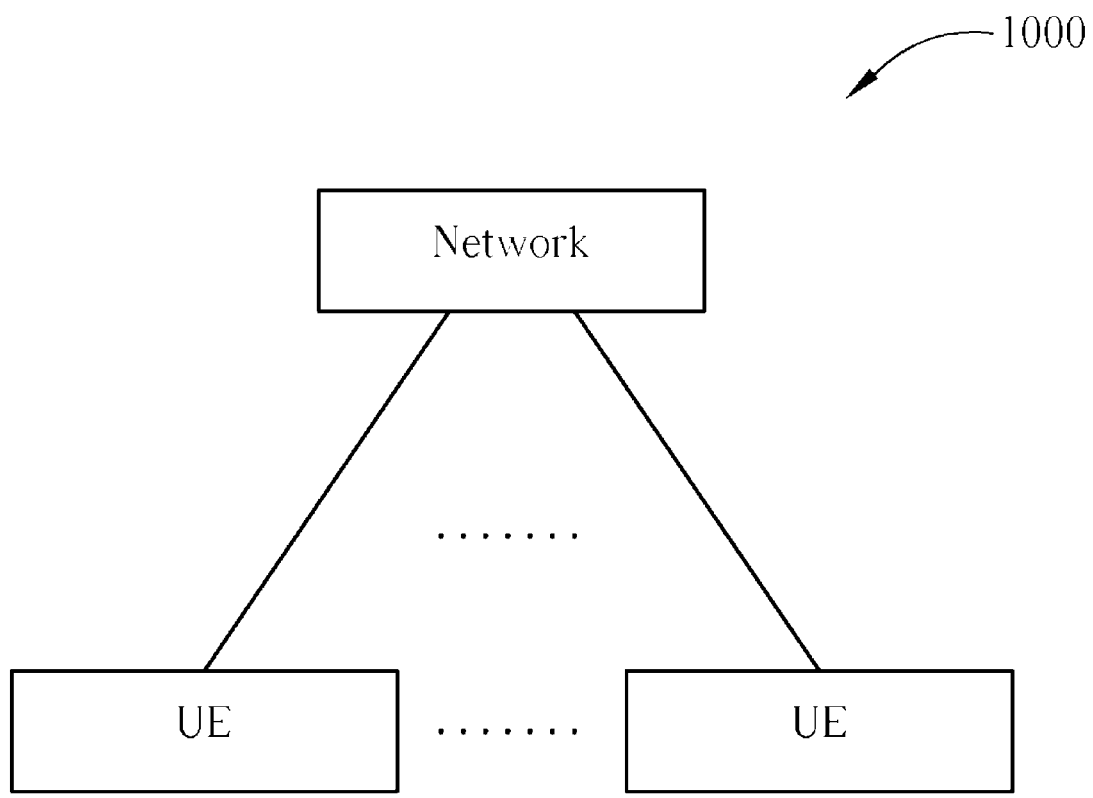
FIG. 2 is a schematic diagram of a wireless communications system.

Please refer to FIG. 2, which illustrates a schematic diagram of a wireless communications system 1000. The wireless communications system 1000 is preferred to be a Long Term Evolution (LTE) system, and is briefly composed of a network and a plurality of user equipments (UEs). In FIG. 2, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 3:
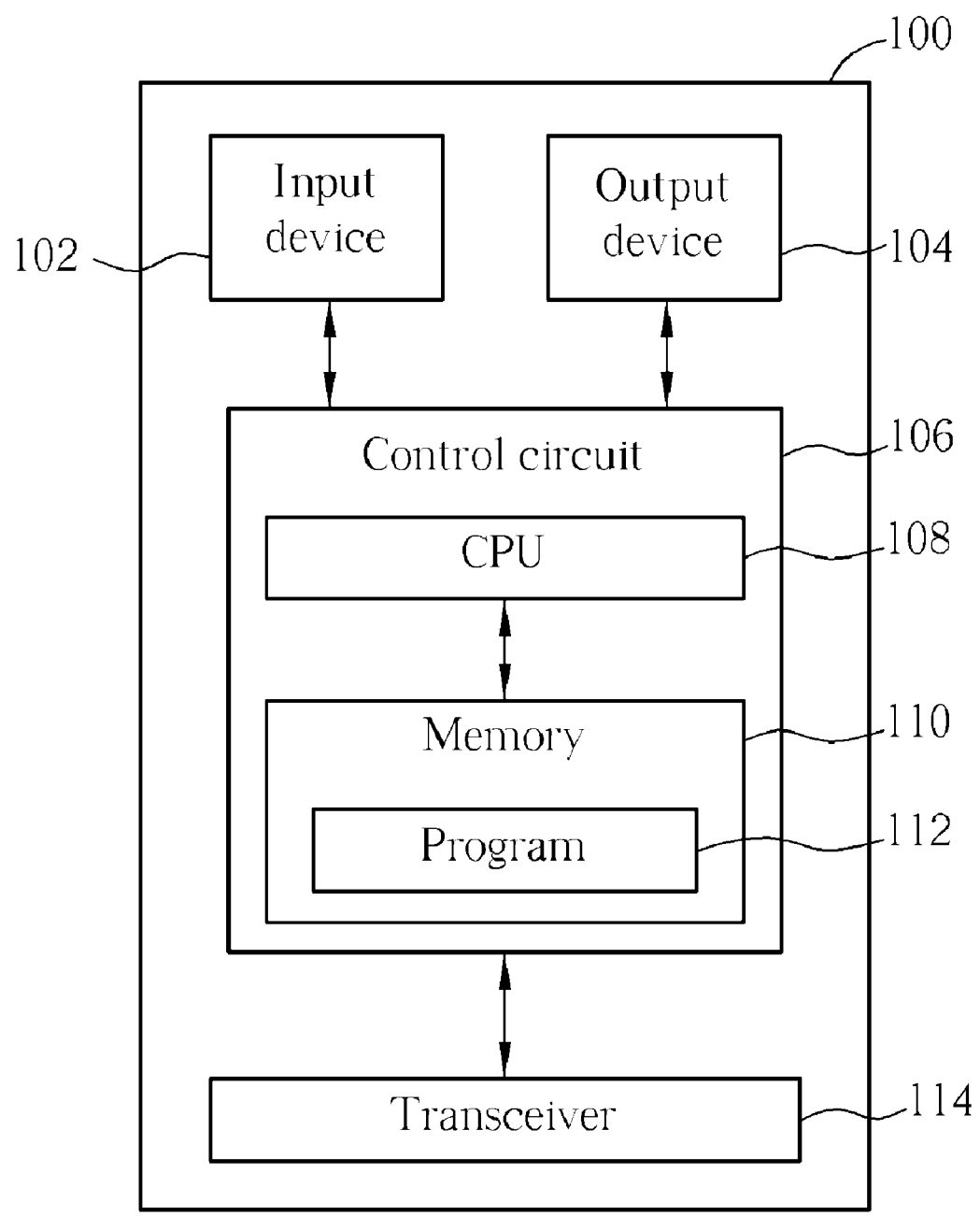
FIG. 3 is a function block diagram of a wireless communications device.

Please refer to FIG. 3, which is a functional block diagram of a communications device 100 in a wireless communications system. The communications device 100 can be utilized for realizing the UEs in FIG. 2, and the wireless communications system is preferably the LTE system. For the sake of brevity, FIG. 3 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
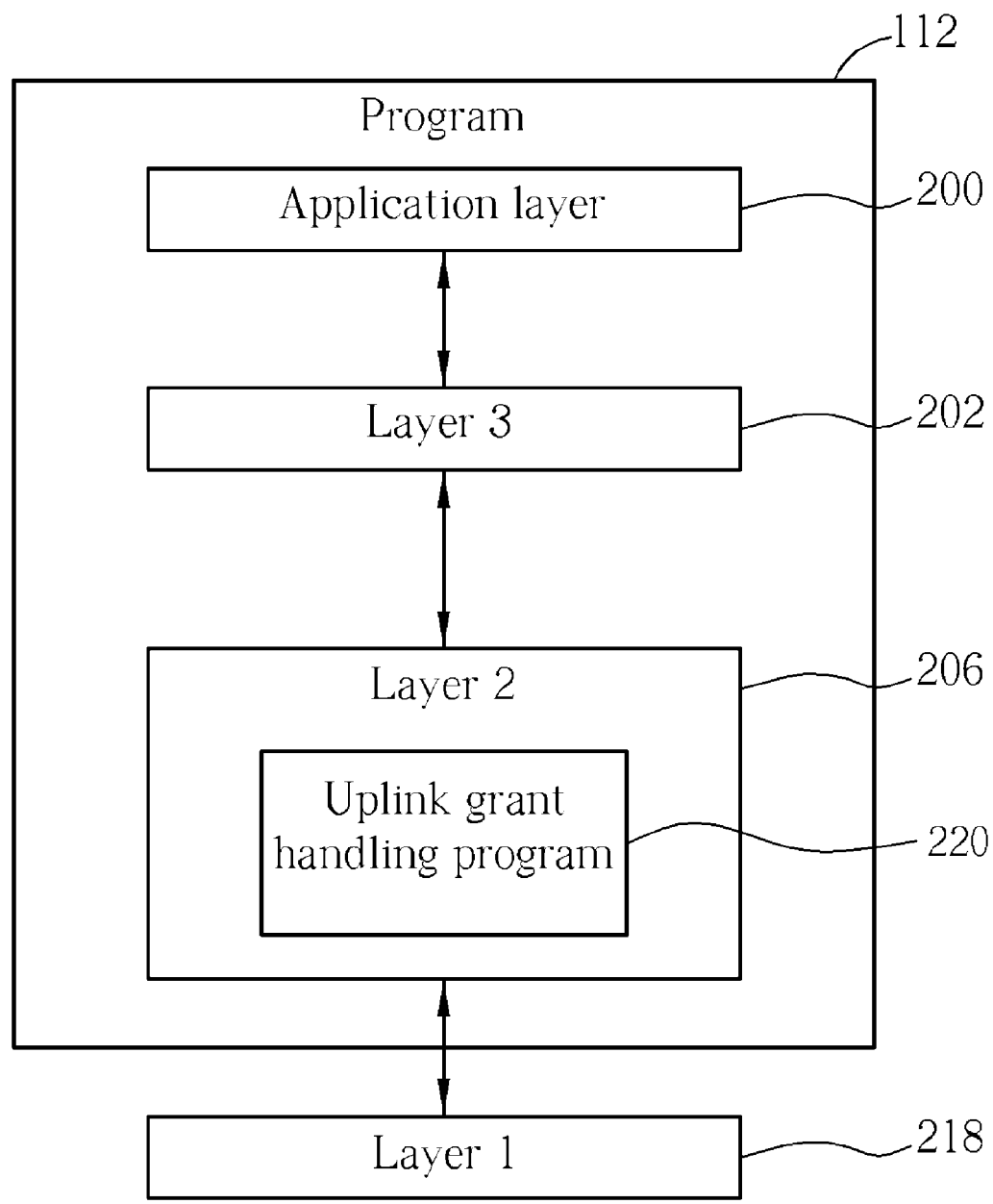
FIG. 4 is a diagram of program of FIG. 3.

Please continue to refer to FIG. 4. FIG. 4 is a schematic diagram of the program 112 shown in FIG. 3. The program 112 includes an application layer 200, a Layer 3 202, and a Layer 2 206, and is coupled to a Layer 1 218. The Layer 3 202 includes a Radio Resource Control (RRC) entity, and is used for performing resource control. The Layer 2 206 includes a Radio Link Control (RLC) entity and a Medium access control (MAC) entity, and is used for performing link control. The Layer 1 218 is used for performing physical connection.

Figure 5:
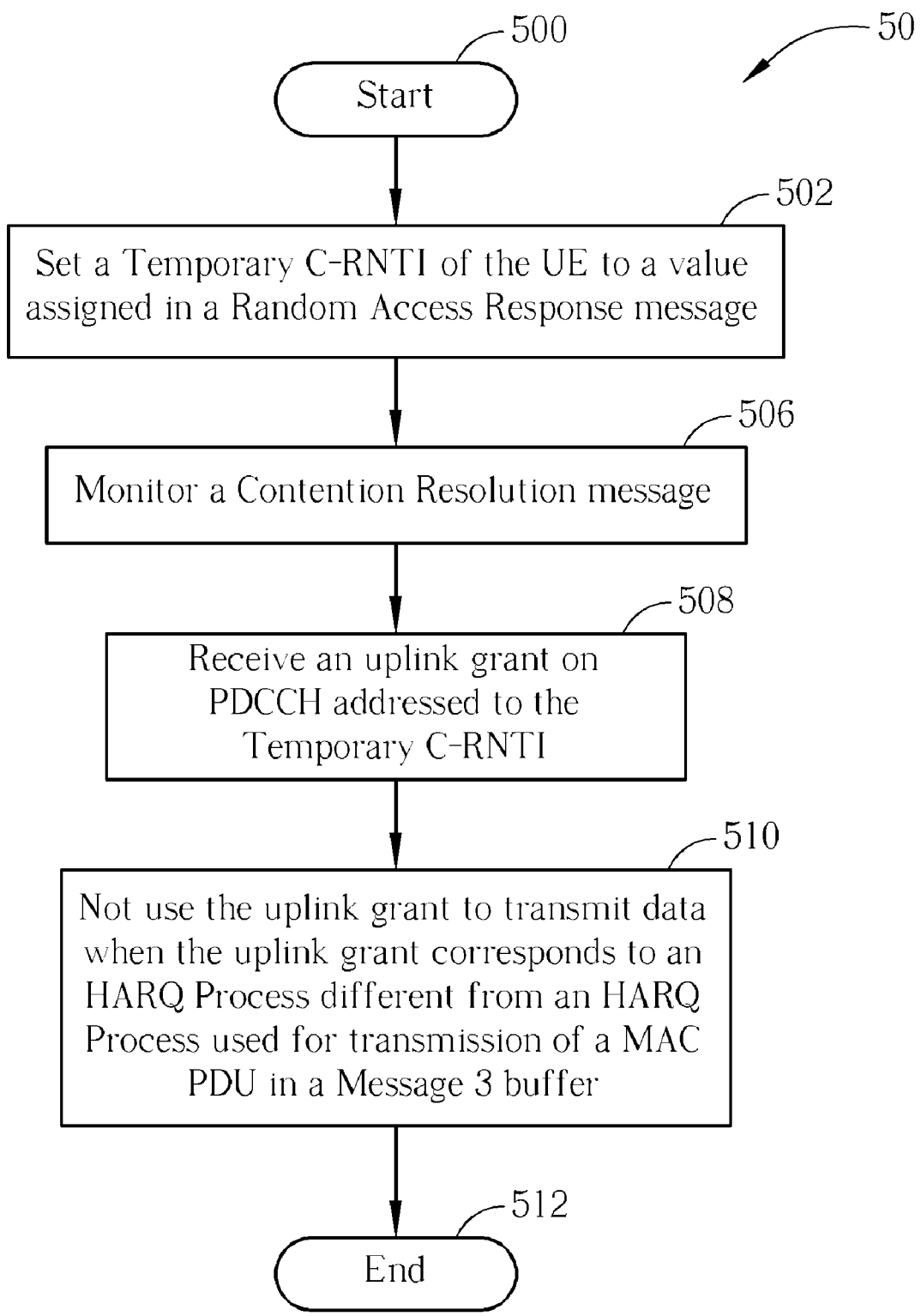
FIG. 5 to FIG. 7 are flowcharts of a process according to an embodiment of the present invention.

In LTE system, a user equipment (UE) uses a Temporary Cell Radio Network Temporary Identifier (Temporary C-RNTI) identical to a C-RNTI of a contention winner to monitor a physical downlink control channel (PDCCH) before the UE knows itself as a contention loser, such that the uplink grant allocated to the contention winner may be misused by the losers. In this case, the embodiment of the present invention provides an uplink grant handling program 220 in the program 112 for preventing the contention losers from misusing the uplink grant allocated to the contention winner. Please refer to FIG. 5, which illustrates a schematic diagram of a process 50 according to an embodiment of the present invention. The process 50 is utilized for handling an uplink grant received on a PDCCH in a UE of a wireless communication system and can be compiled into the uplink grant handling program 220. The process 50 includes the following steps:

Step 500: Start.

Step 502: Set a Temporary C-RNTI of the UE to a value assigned in a Random Access Response message.

Step 506: Monitor a Contention Resolution message.

Step 508: Receive an uplink grant on PDCCH addressed to the Temporary C-RNTI.

Step 510: Not use the uplink grant to transmit data when the uplink grant corresponds to a Hybrid Automatic Repeat Request (HARQ) Process different from an HARQ Process used for transmission of a Medium Access Control (MAC) Protocol Data Unit (PDU) in a Message 3 buffer.

Step 512: End.

According to the process 50, the UE first sets its Temporary C-RNTI to the value assigned in the received Random Access Response message. Then, the UE monitors the Contention Resolution message. When the UE receives an uplink grant on PDCCH addressed to the Temporary C-RNTI, the UE according to the embodiment of the present invention identifies whether the HARQ process corresponding to the uplink grant is identical to the HARQ Process used for transmission of the MAC PDU in the Message 3 buffer. When the HARQ process corresponding to the uplink grant is different from the HARQ Process used for transmission of the MAC PDU in the Message 3 buffer, the UE shall not use the received uplink grant for data transmission. Please note that the said data transmission can be a new transmission or a retransmission.

When the HARQ process corresponding to the received uplink grant is different from the HARQ Process used for transmission of the MAC PDU in the Message 3 buffer, it means that the UE is a contention loser, and thus the UE shall consider its Contention Resolution as not successful, and stop a Contention Resolution Timer of the UE to terminate contention of the random access procedure. Meanwhile, the UE shall discard the Temporary C-RNTI received form the Message 2 (i.e. the Random Access Response message) to prevent the Temporary C-RNTI from being used to monitor PDCCH, such that the uplink grant allocated to the contention winner can be avoided being misused.

In short, the UE according to the embodiment of the present invention compares the HARQ process corresponding to the uplink grant with that used for transmission of the MAC PDU in the Message 3 buffer to determine whether the UE is a contention loser, and is thereby able to prevent the uplink grant allocated to the contention winner from being misused. As a result, the contention winner can successfully perform its uplink transmissions, and network resources can be used more efficiently.

Figure 6:
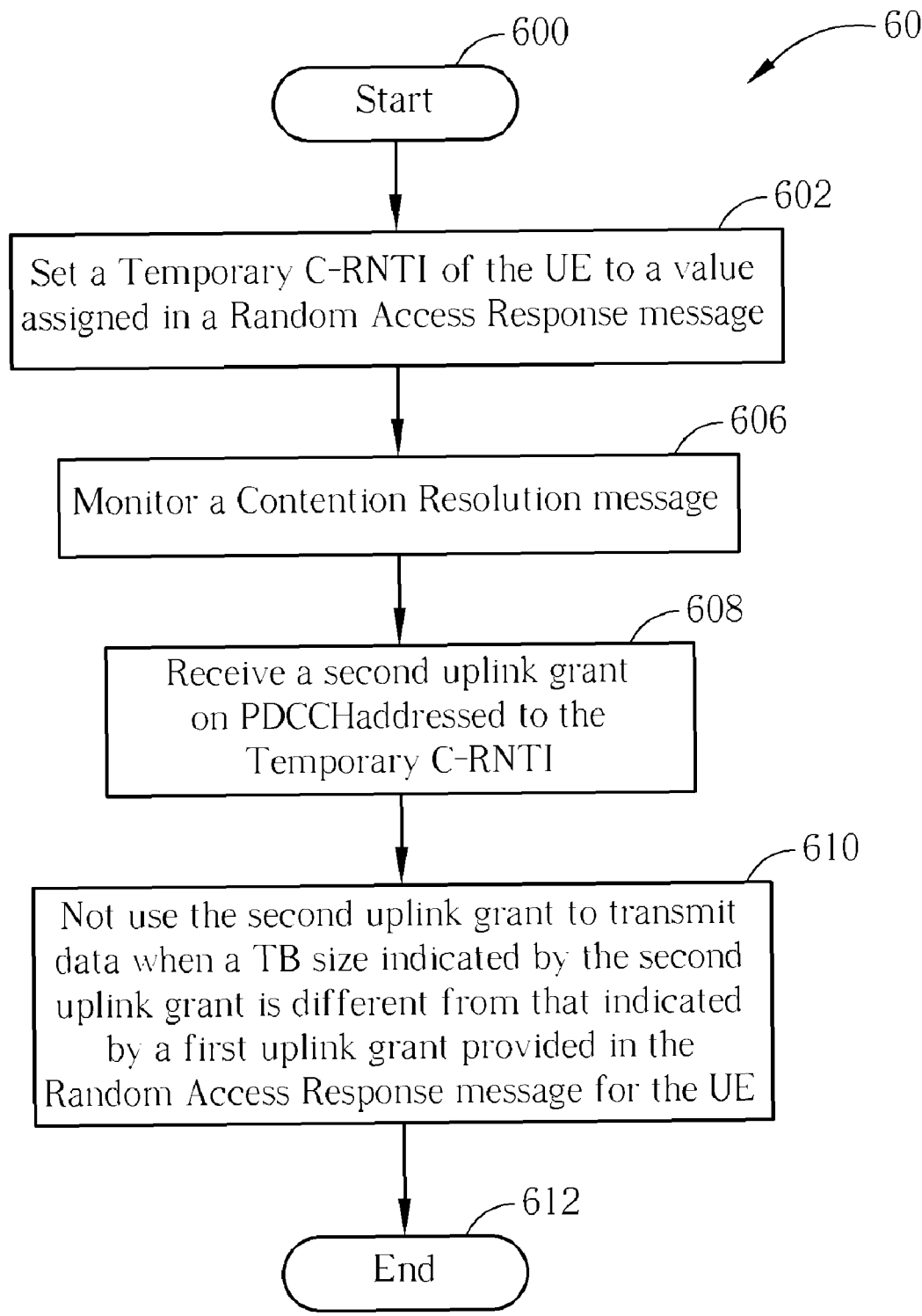

Please refer to FIG. 6, which illustrates a schematic diagram of a process 60 according to another embodiment of the present invention. The process 60 is utilized for handling an uplink grant received on a PDCCH in a UE of a wireless communication system and can also be compiled into the uplink grant handling program 220. The process 60 includes the following steps:

Step 600: Start.

Step 602: Set a Temporary C-RNTI of the UE to a value assigned in a Random Access Response message.

Step 606: Monitor a Contention Resolution message.

Step 608: Receive a second uplink grant on PDCCH addressed to the Temporary C-RNTI.

Step 610: Not use the second uplink grant to transmit data when a TB size indicated by the second uplink grant is different from that indicated by a first uplink grant provided in the Random Access Response message for the UE.

Step 612: End.

According to the process 60, the UE first sets its Temporary C-RNTI to the value assigned in the received Random Access Response message. Then, the UE monitors the Contention Resolution message. When the UE receives the second uplink grant on PDCCH addressed to the Temporary C-RNTI, the UE according to the embodiment of the present invention identifies whether the TB size indicated by the second uplink grant is identical to that indicated by the first uplink grant provided in the Random Access Response message for the UE. When the TB size indicated by the second uplink grant is different from that indicated by the first uplink grant, the UE shall not use the second uplink grant for data transmission. Note that the said data transmission can be a new transmission or a retransmission.

That is to say, when the TB size indicated by the second uplink grant is different from that indicated by the first uplink grant, it means that the second uplink grant is not allocated to the UE for uplink transmission and the UE shall be a contention loser. Thus, the UE shall consider its Contention Resolution as not successful, and stop a Contention Resolution Timer of the UE to terminate contention of the random access procedure. Meanwhile, the UE shall discard the Temporary C-RNTI received from the Message 2 (i.e. the Random Access Response message) to prevent the Temporary C-RNTI from being used to monitor PDCCH, such that the uplink grant allocated to the contention winner can be avoided being misused.

In short, the UE according to the embodiment of the present invention compares the TB size indicated by the second uplink grant with that indicated by the first uplink grant provided in the Random Access Response message for the UE to determine whether the UE is a contention loser, and is thereby able to prevent the uplink grant allocated to the contention winner from being misused. As a result, the contention winner can successfully perform its uplink transmissions, and network resources can be used more efficiently.

Figure 7:
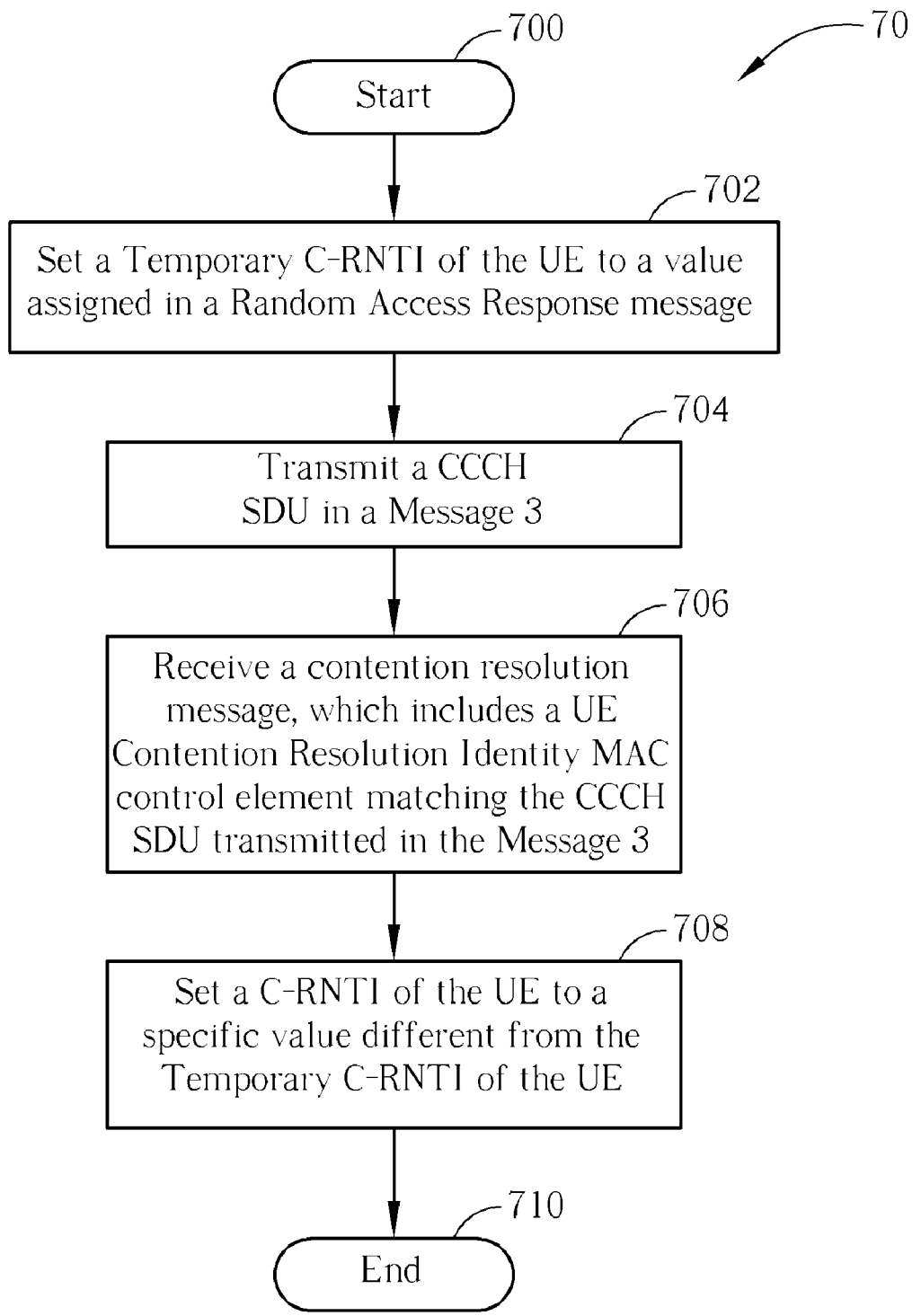

Please refer to FIG. 7, which illustrates a schematic diagram of a process 70 according to another embodiment of the present invention. The process 70 is utilized for setting a Cell Radio Network Temporary Identifier (C-RNTI) of a UE of a wireless communication system and can also be compiled into the uplink grant handling program 220. The process 70 includes the following steps:

Step 700: Start.

Step 702: Set a Temporary C-RNTI of the UE to a value assigned in a Random Access Response message.

Step 704: Transmit a Common Control Channel (CCCH) Service Data Unit (SDU) in a Message 3.

Step 706: Receive a contention resolution message, which includes a UE Contention Resolution Identity MAC control element matching the CCCH SDU transmitted in the Message 3.

Step 708: Set a C-RNTI of the UE to a specific value different from the Temporary C-RNTI of the UE.

Step 710: End.

According to the process 70, the UE first sets its Temporary C-RNTI to the value assigned in the Random Access Response message. Then, the UE transmits a CCCH SDU in the Message 3. When the UE receives the contention resolution message, and the contention resolution message includes a UE Contention Resolution Identity MAC control element matching the CCCH SDU transmitted in the Message 3, the embodiment of the present invention sets the C-RNTI of the UE to a specific value different from the Temporary C-RNTI of the UE.

When the UE contention resolution identity MAC control element included in the Contention Resolution message received by the UE matches the CCCH SDU carried in Message 3, it indicates the UE is a contention winner. The embodiment of the present invention sets the C-RNTI of the contention winner to a specific value different from the Temporary C-RNTI, in order to avoid using the same UE ID as contention losers, such that the uplink grant allocated to the contention winner can be avoided being misused. Please note that the said specific value can be derived from the Temporary C-RNTI of the UE according to a pre-defined rule (e.g. an offset operation or a complement operation), or that the specific value can be set to a pre-configured value (e.g. a value provided in the Random Access Response message). Certainly, appropriate modifications can be made by those skilled in the art, and are not restricted herein.

In short, the embodiment of the present invention sets the C-RNTI of the contention winner to a value different from the Temporary C-RNTI received from the Message 2 to ensure the C-RNTI of the contention winner is different from the Temporary C-RNTI possessed by the Contention losers. Such that even the Temporary C-RNTI are still used by the contention losers for monitoring PDCCH, the uplink grant allocated to the contention winner can be prevented from being received by the contention losers.

In the prior art, before the UE knows itself as a contention loser, the UE would still uses the Temporary C-RNTI received from the Message 2 to monitor PDCCH, such that the UE may misuse the uplink grant allocated to the contention winner for transmission and thereby cause collision with the contention winner. Therefore, the embodiment of the present invention provides three solutions herein: one is to compare the HARQ process corresponding to the received uplink grant with that used for transmission of the MAC PDU in the Message 3 buffer to determine whether the UE is a contention loser; the other is to compare the TB size indicated by the received uplink grant with that provided in the Random Access Response message for the UE to determine whether the UE is a contention loser; another is to set the C-RNTI of the contention winner to a value different form the Temporary C-RNTI received from the Message 2 after the UE is determined as a contention winner. Consequently, the contention losers can be prevented from misusing the uplink grant allocated to the contention winner, and uplink transmission of the contention winner can be performed successfully.

As mentioned above, the embodiment of the present invention provides a method for handling an uplink grant received on PDCCH to avoid misuse of the uplink grant and enhance the network resource using efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling an uplink grant received on a physical downlink control channel (PDCCH) in a user equipment (UE) of a wireless communication system, the method comprising:
    setting a Temporary Cell Radio Network Temporary Identifier (Temporary C-RNTI) of the UE to a value assigned in a Random Access Response message;
    monitoring a Contention Resolution message;
    receiving an uplink grant on PDCCH addressed to the Temporary C-RNTI; and
    not using the uplink grant to transmit data when the uplink grant corresponds to a Hybrid Automatic Repeat Request (HARQ) Process different from an HARQ Process used for transmission of a Medium Access Control (MAC) Protocol Data Unit (PDU) in a Message 3 buffer.

2. The method of claim 1 further comprising:
    stopping a Contention Resolution Timer of the UE.

3. The method of claim 1 further comprising:
    considering contention of the UE as not successful.

4. The method of claim 1 further comprising:
    discarding the Temporary C-RNTI.

5. The method of claim 1, wherein the step of not using the uplink grant to transmit data comprises not using the uplink grant for a new transmission.

6. The method of claim 1, wherein the step of not using the uplink grant to transmit data comprises not using the uplink grant for a retransmission.

7. A communication device for handling an uplink grant received on a physical downlink control channel (PDCCH) in a user equipment (UE) of a wireless communication system, the communication device comprising:
    a processor for executing a program; and
    a memory coupled to the processor for storing the program;
        wherein the program comprises:
            setting a Temporary Cell Radio Network Temporary Identifier (Temporary C-RNTI) of the UE to a value assigned in a Random Access Response message;
            monitoring a Contention Resolution message;
            receiving an uplink grant on PDCCH addressed to the Temporary C-RNTI; and
            not using the uplink grant to transmit data when the uplink grant corresponds to a Hybrid Automatic Repeat Request (HARQ) Process different from an HARQ Process used for transmission of a MediumAccess Control (MAC) Protocol Data Unit (PDU) in a Message 3 buffer.

8. The communication device of claim 7, wherein the program further comprises:
    stopping a Contention Resolution Timer of the UE.

9. The communication device of claim 7, wherein the program further comprises:
    considering contention of the UE as not successful.

10. The communication device of claim 7, wherein the program further comprises:
    discarding the Temporary C-RNTI.

11. The communication device of claim 7, wherein the step of not using the uplink grant to transmit data comprises not using the uplink grant for a new transmission.

12. The communication device of claim 7, wherein the step of not using the uplink grant to transmit data comprises not using the uplink grant for a retransmission.

* * * * *